（12） United States Patent
Weers

(10) Patent No.: US 12,180,428 B2
(45) Date of Patent: Dec. 31, 2024

(54) METHODS OF USING IONIC LIQUIDS AS PARAFFIN INHIBITORS, POUR POINT DEPRESSANTS AND COLD FLOW IMPROVERS

(71) Applicant: Baker Hughes, LLC, Houston, TX (US)

(72) Inventor: Jerry Weers, Richmond, TX (US)

(73) Assignee: Baker Hughes Holdings, LLC, Houston, TX (US)

( * ) Notice: Subject to any disclaimer, the term of this patent is extended or adjusted under 35 U.S.C. 154(b) by 0 days.

(21) Appl. No.: 16/509,418

(22) Filed: Jul. 11, 2019

(65) Prior Publication Data
US 2020/0017790 A1 Jan. 16, 2020

Related U.S. Application Data

(60) Provisional application No. 62/696,544, filed on Jul. 11, 2018.

(51) Int. Cl.
| | |
|---|---|
| *C10G 33/04* | (2006.01) |
| *B01D 17/04* | (2006.01) |
| *B01J 43/00* | (2006.01) |
| *C02F 1/68* | (2023.01) |
| *C02F 101/20* | (2006.01) |
| *C02F 101/32* | (2006.01) |
| *C02F 103/10* | (2006.01) |
| *C08G 8/12* | (2006.01) |
| *C09K 8/524* | (2006.01) |
| *C09K 15/20* | (2006.01) |
| *C09K 15/26* | (2006.01) |
| *C09K 15/30* | (2006.01) |
| *C10G 29/24* | (2006.01) |
| *C10G 29/28* | (2006.01) |
| *C10L 1/236* | (2006.01) |
| *C10L 10/04* | (2006.01) |
| *C10L 10/16* | (2006.01) |
| *C23F 11/14* | (2006.01) |

(52) U.S. Cl.
CPC ........... *C10G 33/04* (2013.01); *B01D 17/047* (2013.01); *B01J 43/00* (2013.01); *C02F 1/682* (2013.01); *C08G 8/12* (2013.01); *C09K 8/524* (2013.01); *C09K 15/20* (2013.01); *C09K 15/26* (2013.01); *C09K 15/30* (2013.01); *C10G 29/24* (2013.01); *C10G 29/28* (2013.01); *C10L 1/236* (2013.01); *C10L 10/04* (2013.01); *C10L 10/16* (2013.01); *C23F 11/149* (2013.01); *C02F 2101/20* (2013.01); *C02F 2101/32* (2013.01); *C02F 2103/10* (2013.01); *C02F 2303/22* (2013.01); *C10G 2300/1011* (2013.01); *C10G 2300/1037* (2013.01); *C10G 2300/104* (2013.01); *C10G 2300/1055* (2013.01); *C10G 2300/1059* (2013.01); *C10G 2300/107* (2013.01); *C10G 2300/1077* (2013.01); *C10G 2300/202* (2013.01); *C10G 2300/205* (2013.01); *C10G 2300/206* (2013.01); *C10G 2300/304* (2013.01); *C10G 2300/4075* (2013.01); *C10G 2300/80* (2013.01); *C10G 2400/02* (2013.01); *C10G 2400/04* (2013.01); *C10L 2200/0438* (2013.01); *C10L 2200/0446* (2013.01); *C10L 2270/026* (2013.01)

(58) Field of Classification Search
CPC .......... C10L 10/04; C10L 10/16; C10L 1/236; C10L 2200/0438; C10L 2200/0446; C10L 2270/026; C10G 2300/1011; C10G 2300/1037; C10G 2300/104; C10G 2300/1055; C10G 2300/1059; C10G 2300/107; C10G 2300/1077; C10G 2300/202; C10G 2300/205; C10G 2300/206; C10G 2300/304; C10G 2300/4075; C10G 2300/80; C10G 2400/02; C10G 2400/04; C10G 29/24; C10G 29/28; C10G 31/08; C10G 33/04; B01D 17/047; B01J 43/00; C02F 1/682; C02F 2101/20; C02F 2101/32; C02F 2103/10; C02F 2303/22; C08G 8/12; C09K 15/20; C09K 15/26; C09K 15/30; C09K 8/524; C09K 8/58; C23F 11/149
See application file for complete search history.

(56) References Cited

U.S. PATENT DOCUMENTS

| | | | |
|---|---|---|---|
| 4,892,944 | A | 1/1990 | Mori et al. |
| 5,143,594 | A | 9/1992 | Stephenson et al. |
| 5,354,453 | A | 10/1994 | Bhatia |
| 5,840,177 | A | 11/1998 | Weers et al. |
| 5,998,530 | A | 12/1999 | Krull et al. |
| 6,013,145 | A | 1/2000 | Amo et al. |
| 6,013,175 | A | 1/2000 | Weers et al. |

(Continued)

FOREIGN PATENT DOCUMENTS

| | | |
|---|---|---|
| CN | 1629257 A | 6/2005 |
| CN | 107177353 A | 9/2017 |

(Continued)

OTHER PUBLICATIONS

Amaraskekara, A. S., "Acidic Ionic Liquids", Chemical Reviews, American Chemical Society Publications, 2016 (50 pages).

(Continued)

*Primary Examiner* — Latosha Hines

(57) ABSTRACT

The disclosure relates to the use of ionic liquids as paraffin inhibitors, pour point depressant or cold flow improvers in the production, treatment and refining of hydrocarbon fluids.

18 Claims, No Drawings

(56) References Cited

U.S. PATENT DOCUMENTS

| | | |
|---|---|---|
| 6,180,683 B1 | 1/2001 | Miller et al. |
| 6,313,367 B1 | 11/2001 | Breen et al. |
| 6,852,229 B2 | 2/2005 | Mehnert et al. |
| 6,924,253 B2 | 8/2005 | Palmer et al. |
| 7,001,504 B2 | 2/2006 | Schoonover |
| 7,432,409 B2 | 10/2008 | Elomari et al. |
| 7,459,011 B2 | 12/2008 | Cadours et al. |
| 7,470,829 B2 | 12/2008 | Cadours et al. |
| 7,605,297 B2 | 10/2009 | Maase et al. |
| 7,786,065 B2 | 8/2010 | Hecht et al. |
| 7,880,024 B2 | 2/2011 | Lim et al. |
| 7,918,905 B2 | 4/2011 | Kremer et al. |
| 8,075,763 B2 | 12/2011 | Sneedon et al. |
| 8,084,402 B2 | 12/2011 | Berry et al. |
| 8,115,040 B2 | 2/2012 | Elomari et al. |
| 8,123,930 B2 | 2/2012 | Cohrs et al. |
| 8,168,830 B2 | 5/2012 | Armstrong et al. |
| 8,461,382 B2 | 6/2013 | Kunz et al. |
| 8,609,572 B2 | 12/2013 | Earl et al. |
| 8,652,237 B2 | 2/2014 | Heldebrant et al. |
| 8,679,203 B2 | 2/2014 | O'Brien et al. |
| 8,758,600 B2 | 6/2014 | Koseoglu. et al. |
| 8,821,716 B2 | 9/2014 | Victorovna Likhanova et al. |
| 8,858,803 B2 | 10/2014 | Guliashvili et al. |
| 8,888,993 B2 | 11/2014 | Verma et al. |
| 8,915,990 B2 | 12/2014 | Betting et al. |
| 8,916,734 B2 | 12/2014 | Tang et al. |
| 8,992,767 B2 | 3/2015 | Koseoglu. et al. |
| 9,157,034 B2 | 10/2015 | Martinez Palou et al. |
| 9,249,261 B2 | 2/2016 | Anderson |
| 9,267,082 B2 | 2/2016 | Braden et al. |
| 9,328,295 B2 | 5/2016 | Gattupalli et al. |
| 9,360,425 B2 | 6/2016 | Jennings et al. |
| 9,394,617 B2 | 7/2016 | Hall et al. |
| 9,404,052 B2 | 8/2016 | Flores Oropeza et al. |
| 9,447,335 B2 | 9/2016 | Abai et al. |
| 9,453,830 B2 | 9/2016 | Zhang et al. |
| 9,464,239 B2 | 10/2016 | Nares Ochoa et al. |
| 9,574,139 B2 | 2/2017 | Broderick et al. |
| 9,587,182 B2 | 3/2017 | Flores Oropeza et al. |
| 9,593,015 B2 | 3/2017 | Ballaguet et al. |
| 9,611,209 B1 | 4/2017 | Liu et al. |
| 9,611,434 B2 | 4/2017 | Morgan et al. |
| 9,624,758 B2 | 4/2017 | Hardy et al. |
| 9,637,676 B2 | 5/2017 | Leonard et al. |
| 9,637,689 B2 | 5/2017 | Al-Hajji et al. |
| 9,663,726 B2 | 5/2017 | Yang et al. |
| 9,765,044 B2 | 9/2017 | Socha et al. |
| 9,803,450 B2 | 10/2017 | Hardy et al. |
| 9,850,197 B2 | 12/2017 | Martinez Palou et al. |
| 9,856,422 B2 | 1/2018 | Hardacre et al. |
| 9,926,775 B2 | 3/2018 | O'Rear et al. |
| 10,000,641 B2 | 6/2018 | Miles et al. |
| 10,093,868 B1 | 10/2018 | Weers et al. |
| 10,174,429 B2 | 1/2019 | Kalakodimi et al. |
| 10,174,439 B2 | 1/2019 | Kalakodimi et al. |
| 10,179,879 B2 | 1/2019 | O'Rear et al. |
| 10,246,629 B2 | 4/2019 | Gill |
| 10,301,553 B2 | 5/2019 | Geissler et al. |
| 10,858,604 B2 | 12/2020 | Ngyuen et al. |
| 2002/0055438 A1 | 5/2002 | Giard-Blanchard et al. |
| 2003/0085156 A1 | 5/2003 | Schoonover |
| 2003/0204041 A1 | 10/2003 | Laas et al. |
| 2004/0044264 A1 | 3/2004 | Smith |
| 2004/0188350 A1 | 9/2004 | Beste et al. |
| 2005/0005840 A1 | 1/2005 | Bonrath |
| 2005/0010076 A1 | 1/2005 | Wasserscheid et al. |
| 2005/0241997 A1 | 11/2005 | Kremer et al. |
| 2006/0054538 A1 | 3/2006 | Hsu et al. |
| 2006/0070917 A1 | 4/2006 | McCarthy et al. |
| 2006/0223995 A1 | 10/2006 | Uchimura et al. |
| 2007/0062698 A1 | 3/2007 | Smith et al. |
| 2007/0123446 A1 | 5/2007 | Kenneally et al. |
| 2007/0142211 A1 | 6/2007 | Elomari et al. |
| 2007/0142642 A1 | 6/2007 | Szarvas et al. |
| 2007/0221539 A1 | 9/2007 | Cohrs et al. |
| 2008/0114105 A1 | 5/2008 | Hell et al. |
| 2008/0251759 A1 | 10/2008 | Kalb et al. |
| 2009/0090655 A1 | 4/2009 | Stark et al. |
| 2009/0291872 A1 | 11/2009 | Bara et al. |
| 2009/0320771 A1 | 12/2009 | Torres, Jr. et al. |
| 2010/0093577 A1 | 4/2010 | Ritchie et al. |
| 2010/0147022 A1 | 6/2010 | Hart et al. |
| 2010/0217010 A1 | 8/2010 | Massonne et al. |
| 2010/0270211 A1 | 10/2010 | Wolny |
| 2010/0297532 A1 | 11/2010 | Beste et al. |
| 2011/0172473 A1 | 7/2011 | Nguyen et al. |
| 2011/0186515 A1 | 8/2011 | Lourenco-Guimaraes et al. |
| 2011/0266504 A1 | 11/2011 | Fransaer |
| 2012/0024751 A1 | 2/2012 | He et al. |
| 2012/0031810 A1 | 2/2012 | Stark et al. |
| 2012/0053101 A1 | 3/2012 | Yang et al. |
| 2012/0121485 A1 | 5/2012 | Rogers et al. |
| 2012/0186993 A1 | 7/2012 | Huang et al. |
| 2012/0238764 A1 | 9/2012 | Klein et al. |
| 2012/0255886 A1 | 10/2012 | Flores Oropeza et al. |
| 2012/0261312 A1* | 10/2012 | Flores Oropeza . C08G 65/2621 516/135 |
| 2012/0321967 A1 | 12/2012 | Wolfe et al. |
| 2013/0041159 A1 | 2/2013 | Siemer et al. |
| 2013/0101460 A1 | 4/2013 | Ramachandran et al. |
| 2013/0205654 A1* | 8/2013 | Peretolchin ............ C10L 1/232 548/335.1 |
| 2013/0209324 A1 | 8/2013 | Timken et al. |
| 2013/0261227 A1 | 10/2013 | Nguyen |
| 2013/0280151 A1 | 10/2013 | Lee et al. |
| 2013/0288886 A1 | 10/2013 | Aduri et al. |
| 2014/0007768 A1 | 1/2014 | van den Broeke et al. |
| 2014/0045732 A1 | 2/2014 | Mazyar et al. |
| 2014/0158928 A1 | 6/2014 | Zhou et al. |
| 2014/0170041 A1 | 6/2014 | Harrison et al. |
| 2014/0299543 A1 | 10/2014 | Zhou et al. |
| 2014/0350299 A1 | 11/2014 | Huo et al. |
| 2014/0378718 A1 | 12/2014 | Gu et al. |
| 2015/0034310 A1* | 2/2015 | Brennecke ............ C09K 8/594 166/250.12 |
| 2015/0047849 A1 | 2/2015 | Wicker, Jr. et al. |
| 2015/0093313 A1 | 4/2015 | Broderick et al. |
| 2015/0111799 A1 | 4/2015 | Miranda Olvera et al. |
| 2015/0118104 A1 | 4/2015 | Marin Cruz et al. |
| 2015/0231529 A1 | 8/2015 | Akolekar et al. |
| 2016/0001218 A1 | 1/2016 | Rota |
| 2016/0032161 A1 | 2/2016 | Campbell et al. |
| 2016/0075952 A1 | 3/2016 | Kim et al. |
| 2016/0146734 A1 | 5/2016 | Felipe et al. |
| 2016/0175737 A1 | 6/2016 | Hembre et al. |
| 2016/0177691 A1 | 6/2016 | Benson et al. |
| 2016/0185732 A1 | 6/2016 | Pommersheim |
| 2016/0230101 A1 | 8/2016 | Nguyen et al. |
| 2016/0326432 A1 | 11/2016 | Felipe et al. |
| 2016/0367976 A1 | 12/2016 | Uppara et al. |
| 2017/0077557 A1 | 3/2017 | Zheng et al. |
| 2017/0096606 A1 | 4/2017 | Pinappu et al. |
| 2017/0101375 A1 | 4/2017 | Poshusta et al. |
| 2017/0107162 A1 | 4/2017 | Duggal et al. |
| 2017/0114001 A1 | 4/2017 | Atkins et al. |
| 2017/0222266 A1 | 8/2017 | Zheng et al. |
| 2017/0343526 A1 | 11/2017 | Cooks et al. |
| 2019/0048712 A1 | 2/2019 | Jennings et al. |
| 2019/0062267 A1 | 2/2019 | Dhawan et al. |
| 2019/0127639 A1 | 5/2019 | Moloney et al. |
| 2019/0127640 A1 | 5/2019 | Moloney et al. |
| 2019/0177599 A1 | 6/2019 | Weers |
| 2019/0177622 A1 | 6/2019 | Weers |
| 2020/0017766 A1 | 1/2020 | Weers |
| 2020/0017776 A1 | 1/2020 | Weers |
| 2020/0017790 A1 | 1/2020 | Weers |

FOREIGN PATENT DOCUMENTS

| | | | |
|---|---|---|---|
| CN | 108148565 A | | 6/2018 |
| GB | 2304729 A | | 8/1996 |
| GB | 2564735 A | * | 1/2019 .......... C10M 133/06 |
| WO | 02/34863 A1 | | 5/2002 |

(56) References Cited

FOREIGN PATENT DOCUMENTS

| WO | 03/051894 A1 | 6/2003 | |
|---|---|---|---|
| WO | 2003051894 A1 | 6/2003 | |
| WO | WO2007101397 A1 | 9/2007 | |
| WO | WO-2007138307 A2 * | 12/2007 | ............ C10G 21/27 |
| WO | 2008052860 A1 | 5/2008 | |
| WO | 2009040242 A1 | 4/2009 | |
| WO | 2012123336 A1 | 9/2012 | |
| WO | 2013096217 A1 | 6/2013 | |
| WO | 2013096218 A1 | 6/2013 | |
| WO | 2013171060 A1 | 11/2013 | |
| WO | 2016189333 A1 | 12/2016 | |
| WO | WO-2017017454 A1 * | 2/2017 | ........... C07D 207/04 |
| WO | 2017105476 A1 | 6/2017 | |
| WO | 2017136728 A1 | 8/2017 | |
| WO | 2020014510 A1 | 1/2020 | |
| WO | 2020014529 A1 | 1/2020 | |
| WO | 2020014534 A1 | 1/2020 | |
| WO | 2020036698 A2 | 2/2020 | |

OTHER PUBLICATIONS

Balsamo, M, et al., "Chemical Demulsification of Model Water-in-oil Emulsions with Low Water Content by Means of Ionic Liquids," Brazilian Journal of Chemical Engineering, vol. 34, No. 1, pp. 273-282, 2017 (10 pages).

Falkler, T., et al., "Fine-tune processing heavy crudes in your facility," Hydrocarbon Processing, Refining Developments, Sep. 2010 (6 pages).

Flores, Cesar A., et al., "Anion and cation effects of ionic liquids and ammonium salts evaluated as dehydrating agents for super-heavy crude oil: Experimental and theoretical points of view," Elsevier, Journal of Molecular Liquids 2014 (9 pages).

Ghandi, K., "A Review of Ionic Liquids, Their Limits and Applications," Green and Sustainable Chemistry, 2014, Jan. 4, 2014, (10 pages).

Hazrati, N., et al., Demulsification of water in crude oil emulsion using long chain imidazolium ionic liquids and optimization of parameters, Elsevier, Fuel 229, 126-134, 2018 (9 pages).

Ibrahim, M.H., "The role of ionic liquids in desulfurization of fuels: a review", Elsevier, Renewable and Sustainable Energy Reviews, 2017, 1534-1549 (16 pages).

Jennings, D.W., "Ms New Dead-Crude Oil Asphaltene Inhibitor Test Method," OTC-25113-MS, 2014 (14 pages).

Papaiconomou, N., et al., "Selective Extraction of Copper, Mercury, Silver, and Palladium Ions from Water Using Hydrophobic Ionic Liquids," Ind. Eng. Chem Res, 2008, 47, 5080-5086 (7 pages).

Shah, S., N., "Extraction of Naphthenic Acid from Highly Acidic Oil Using Hydroxide-Based Ionic Liquids," ACS Publications 2014, 106-111 (6 pages).

Sulemana, N.T., et al., "Application of Ionic Liquids in the Upstream oil Industry-A Review", International Journal of Petrochemistry and Research, vol. 1, Issue 1, 2017, 50-60 (10 pages).

Velusamy, S., et al., "Substantial Enhancement of Heavy Crude Oil Dissolution in Low Waxy Crude Oil in the Presence of Ionic Liquid," Industrial & Engineering Chemistry Research, 2015, 7999-8009 (11 pages).

"Hydrogen Sulfide and Mercaptan Sulfur in Liquid Hydrocarbons," UOP Method 163-89, 1989 (7 pages).

Standard Test Method for Acid Number of Petroleum Products by Potentiometric Titration, ASTM, D-664-07, Designation 177/96, 2007 (8 pages).

Anderson, K., et al., "Naphthenic acid extraction and speciation from Doba crude oil using carbonate-based ionic iquids," Fuel, 146 (2015) 60-68.

Biniaz, P., et al., "Demulsification of water in oil emulsion using ionic liquids: Statistical modeling and optimization," Fuel 184 (2016) 325-333.

Boukherissa, M., et al., "Ionic Liquids as Dispersants of Petroleum Asphaltenes," Energy & Fuels (2009), 23, 2557-2564.

Hallett, J.P., et al., Room-Temperature Ionic Liquids: Solvents for Synthesis and Catalysis. 2, Amer. Chem. Soc. Publications, Chemical Reviews (2011) pp. 3508-3576.

Hu, Y, et al., "Effect of the Structures of Ionic Liquids and Alkylbenzene-Derived Amphiphiles on the Inhibition of Asphaltene Precipitation from Co2-Injected Reservoir Oils," Amer. Chem. Soc. Publications, (2005) 8168-8174.

Nezhad, E.R., et al., "Dispersing of Petroleum Asphaltenes by Acidic Ionic Liquid and Determination by UV-Visible Spectroscopy," Journal of Petroleum Engineering, vol. 2013, Article ID 203036, pp. 1-5 (2013).

Pereira, J.C., et al., "Resins: The Molecules Responsible for the Stability/Instability Phenomena of Asphaltenes," Energy & Fuels (2007), 21, 1317-1321.

Sakthivel, S., et al., Experimental Investigation on the Effect of Aliphatic Ionic Liquids on the Solubility of Heavy Crude Oil Using UV-Visible, Fourier Transform-Infrared, and 13C NMR Spectroscopy, (2014), Amer. Chem. Soc. Publications, pp. 6151-6162.

Shaban, S., et al., "Upgrading and Viscosity Reduction of Heavy Oil by Catalytic Ionic Liquid," (2014) Amer. Chem. Soc., pp. 6545-6553.

Subramanian, D., et al., "Ionic liquids as viscosity modifiers for heavy and extra-heavy crude oils," Fuel 143 (2015), 519-526.

Atta, A.M., et al. Application of new amphiphilic IL based on ethoxylated octadecylammonium tosylate demulsifier and crude oil spill dispersant, J. Industrial Engineering Chem., vol. 33, p. 122 (2016).

Yang, D., et al., "Comparison of the corrosion inh properties of imidazole based ionic liquids on API X52 steel in carbon dioxide saturated NaCL solution," Corrosion 2014, SPE Paper 4357.

Sakthivel, S., et al., "Nature Friendly Application of Ionic Liquids for Dissolution Enhancement of Heavy Crude Oil", SPE Paper 178418-MS (2015), Society of Petroleum Engineers.

Sakthivel, S., "Eco-Efficient Method for the Dissolution Enhancement of Heavy Crude Oil Using Ionic Liquids", SPE Paper 175160-MS (2015) Society of Petroleum Engineers.

Balsamo, M, et al., "Chemical Demulsification of Model Water-in-oil Emulsions with Low Water Content by Means of Ionic Liquids," Brazilian Journal of Chemical Engineering, vol. 34, No. 1, pp. 273-282, 2017 (10 pages).

Standard Test Method for Acid No. of Petroleum Products by Potentiometric Titration, ASTM, D-664-07, Designation 177/96, 2007 (8 pages).

* cited by examiner

METHODS OF USING IONIC LIQUIDS AS PARAFFIN INHIBITORS, POUR POINT DEPRESSANTS AND COLD FLOW IMPROVERS

This application claims the benefit of U.S. application Ser. No. 62/696,544, filed on Jul. 11, 2018 which is herein incorporated by reference.

SPECIFICATION

Field

The disclosure relates to the use of ionic liquids as paraffin inhibitors, pour point depressants as well as cold flow improvers in the production, treatment and refining of hydrocarbon fluids.

Background

During the course of oil production, temperature and pressure changes result in the crystallization, precipitation and deposition of paraffin, a component of crude oil. This causes difficulties in pumping and/or transporting crude oil as paraffins are deposited in production tubing, valves, pumps, flow lines, screens and filters and plant parts, such as tanks.

The precipitation of paraffin wax crystals is particularly problematic when the temperature goes below the pour point as the oil loses its fluidity. This may ultimately result in solidification. In such cases, it is necessary to stop production which is both time-consuming and costly in order to remove paraffin precipitates from wells and equipment.

To prevent the deposition or solidification of paraffins, paraffin inhibitors (or wax crystal modifiers) and pour point depressants are added to the crude oil. Paraffin inhibitors change the nature of the wax crystals, thereby reducing the tendency of wax crystals to set. Pour point depressants reduce the pour point in crude oils. Generally paraffin inhibitors and pour point depressants consist of polymeric structures which have a waxy consistency.

Many commercially available pour point depressants and paraffin inhibitors solidify at temperatures ranging from −5° C. to 60° C. Such systems are not useful at cold temperatures or under winter conditions.

A similar problem arises with paraffin rich hydrocarbon fuel oils. As paraffins crystallize (especially in middle distillates, diesel and heating oils) at lower temperatures, fuel constituents are incorporated in the crystal composite and agglomerate partly with intercalation of the oil. This causes significant deterioration in flow properties. For instance, crystallization and agglomeration of wax crystals can result in blockages of the filters in engines and boilers. This prevents reliable dosage of the fuels and, under some circumstances, can cause complete interruption of the fuel supply. Further, problems are encountered by heating oils, diesel oils and jet fuels having too high a pour point as distribution of heating oil by pumping is rendered difficult, if impossible, at temperatures around or below the pour point of the oil. Flow of the oil at such low temperatures through the filters cannot be maintained.

To alleviate these problems, cold flow improvers are metered into the fuel. Some common commercial cold flow inhibitors are of the same polymeric materials as wax crystal modifiers. They too often solidify at low temperatures and thus are not particularly useful at cold temperatures or under winter conditions.

Alternatives have therefore been sought for paraffin inhibitors, pour point depressants and cold flow improvers.

SUMMARY

In an embodiment, the disclosure relates to the use of electronically neutral ionic liquids as paraffin inhibitors, pour point depressants and cold flow improvers; the ionic liquids being of formula (I):

$$A^+X^- \quad \quad (I)$$

wherein A is or contains nitrogen, a nitrogen containing heterocyclic ring, is or contains phosphorus, or a phosphorus containing heterocycle; and X is an anion selected from the group consisting of halides; hydroxyl; carbonates; alkyl carbonates; bicarbonates; dithiocarbonates; trithiocarbonates; xanthates, thiocyanates; alkoxides; carboxylates; hydroxycarboxylates; amino fatty acids; anionic alkoxylated fatty acids; thiocyanates; anionic metallic complexes, sulfur or silicon containing anions; anionic phosphate esters, anionic thiophosphate esters; anionic phosphonate esters; anionic thiophosphonate esters; alkyl substituted phosphines; anionic urea; anionic thiourea; anionic natural products; anionic thiols; anionic phenols; anionic phenol resins; anionic copolymers of alpha olefins and maleic anhydride, esters, amides, imides or derivatives thereof; anionic acrylamido-methyl propane sulfonate/acrylic acid copolymers; anionic homopolymers, copolymers and terpolymers of one or more acrylates, methacrylates and acrylamides, optionally copolymerized with one or more ethylenically unsaturated monomers; anionic copolymers of olefins and vinyl acetate; anionic phosphated maleic copolymers; an anionic homo or copolymer of an oxirane or methyloxirane; and mixtures thereof or a zwitterion.

Another embodiment relates to the use of ionic liquids as paraffin inhibitors, pour point depressants and cold flow improvers; the ionic liquids being of formula (II) or (III):

$$R^1R^2R^3R^4A^+X^- \quad \quad (II); or$$

$$R^1R^2R^3A^+R^8A^+R^5R^6R^7X^- \quad \quad (III)$$

wherein:

A in formula (II) is or contains nitrogen or phosphorus or a heterocyclic ring thereof and wherein each A in formula (III) is independently selected from nitrogen or phosphorus or a heterocyclic ring thereof; and X is an anion selected from the group consisting of halides; hydroxyl; carbonates; alkyl carbonates; bicarbonates; carboxylates; hydroxycarboxylates; sulfonates; sulfates; bisulfites; thiocyanates; dithiocarbonates; dithiocarbonates; trithiocarbonates; carbamates; dithiocarbamates; xanthates; sulfides; polysulfides; alkoxides; anionic urea; anionic alkyl substituted phosphines; anionic amino fatty acids; anionic alkoxylated fatty acids; anionic acrylamido-methyl propane sulfonate/acrylic acid copolymers; anionic phosphated maleic copolymers; anionic metal complexes; sulfur or silicon containing anions; anionic phosphate esters; anionic thiophosphate esters; anionic phosphonate esters; anionic thiophosphonate esters; anionic thiols; anionic natural products; anionic phenols; anionic phenol resins; anionic copolymers of alpha olefins and maleic anhydride, esters, amides, imides or derivatives thereof; anionic alkyl substituted phosphines; and anionic homopolymers, copolymers and terpolymers of one or more acrylates, methacrylates and acrylamides and acids, optionally copolymerized with one or more ethylenically unsaturated monomers; anionic copolymers of olefins and vinyl acetate; anionic homo and copolymers of oxirane and/or methyloxirane; and mixtures thereof; and further wherein $R^1$, $R^2$, $R^3$, $R^4$, $R^5$, $R^6$ and $R^7$ are independently selected from the group consisting of hydrogen; benzyl; alkylbenzyl, or oxyalkyl (including —$CH_2CH_2OH$) or —$CH_2CH(CH_3)OH$); a straight or branched alkyl group, an alkylbenzyl group, an arylalkyl group, a straight or branched chain alkenyl group, a hydroxyalkyl group or a hydroxyalkylbenzyl group; and a polyoxyalkylene group; and $R^8$ is a straight or branched alkylene group, an alkylene oxyalkylene, or an alkylene polyoxyalkylene or a zwitterion; and further wherein R groups may be joined to form a heterocyclic nitrogen, sulfur or phosphorus containing ring.

In another embodiment, a method of enhancing the performance of a second paraffin inhibitor, second pour point depressant or second cold flow improver, as defined herein, is provided by contacting the second paraffin inhibitor, second pour point depressant or second cold improver with a paraffin inhibiting ionic liquid, pour point depressing ionic liquid or cold flow improver ionic liquid, respectively. In these instances, the paraffin inhibiting ionic liquid, pour point depressing ionic liquid and cold flow improver ionic liquid may act as a promoter for the second paraffin inhibitor, second pour point depressant or second cold flow improver, respectively; the second paraffin inhibitor, second pour point depressant and second cold second flow improver not being an ionic liquid.

DETAILED DESCRIPTION

The description provides specific details, such as material types, compositions, and processing conditions in order to provide a thorough description of embodiments of the disclosure. Characteristics and advantages of this disclosure and additional features and benefits will be readily apparent to those skilled in the art upon consideration of the following detailed description of exemplary embodiments. The description herein, being of exemplary embodiments, is not intended to limit the scope of the claims.

As used herein and throughout various portions (and headings) of this patent application, the terms "disclosure", "present disclosure" and variations thereof are not intended to mean every possible embodiment encompassed by this disclosure or any particular embodiment(s). Thus, the subject matter of each such reference should not be considered as necessary for, or part of, every embodiment hereof or of any particular embodiment(s) merely because of such reference.

Certain terms are used herein and in the appended embodiments to refer to particular components. As one skilled in the art will appreciate, different persons may refer to a component by different names. This document does not intend to distinguish between components that differ in name but not function. Also, the terms "including" and "comprising" are used herein and in the appended embodiments in an open-ended fashion, and thus should be interpreted to mean "including, but not limited to . . . ." Further, reference herein and in the appended embodiments to components and aspects in a singular tense does not limit the present disclosure or appended embodiments to only one such component or aspect, but should be interpreted generally to mean one or more, as may be suitable and desirable in each particular instance. Thus, the use of the terms "a", "an", "the" the suffix "(s)" and similar references are to be construed to cover both the singular and the plural, unless otherwise indicated herein or clearly contradicted by context.

All ranges disclosed herein are inclusive of the endpoints, and the endpoints are independently combinable with each other. Unless stated otherwise, any range of values within the endpoints is encompassed. For example, where the endpoints of a range are stated to be from 1 to 10, any range of values, such as from 2 to 6 or from 3 to 5 will be defined by the range.

All references are incorporated herein by reference.

The phrase "ionic liquid" refers to neutral molten salts composed entirely of ions and which are liquid at ambient or near ambient temperatures. The phrase shall include those quaternary organic salts of the formula (I), (II) or (III) as described herein.

The phrase "pour point" is defined as the lowest temperature at which crude oil will flow when held in a pour point tube at ninety degrees to the upright for five seconds, ASTM D-97.

The phrase "paraffin inhibitor" is defined as a chemical (including polymeric and/or oligomeric chemicals) or a chemical mixture which retards, delays, minimizes, reduces, inhibits or prevents the phase separation of paraffin wax from a hydrocarbon fluid to which it is added.

The phrase "paraffin inhibiting ionic liquid" shall refer to an ionic liquid used as a paraffin inhibitor.

The phrase "pour point depressant" is defined as a chemical (including polymeric and/or oligomeric chemicals) or a chemical mixture which reduces the pour point of a hydrocarbon fluid.

The phrase "pour point depressing ionic liquid" shall refer to an ionic liquid used as a pour point depressant.

The phrase "cold flow improver" is defined as a chemical (including polymeric and/or oligomeric chemicals) or a chemical mixture which enhances fluidity of a hydrocarbon fluid at low temperatures.

The phrase "cold flow improver ionic liquid" shall refer to an ionic liquid used as a cold flow improver.

The phrase "PIPPCFI ionic liquid" shall be construed to mean any of the paraffin inhibiting ionic liquids, pour point depressing ionic liquids or cold flow improver ionic liquids.

The phrases "second paraffin inhibitor"; "second pour point depressant" and "second cold flow improver" shall refer to any paraffin inhibitor, pour point depressant and cold flow improver, respectively, which is not an ionic liquid.

The phrase "second PIPPCFI" shall be construed to mean any second paraffin inhibitor, second pour point depressant or second cold flow improver.

The phrase "paraffin treatment composition"; "pour point treatment composition" and "cold flow treatment composition" shall refer to a composition resulting from contact of a paraffin inhibiting ionic liquid with a second paraffin inhibitor, pour point depressing ionic liquid with a second point depressant or cold flow improver ionic liquid with a second cold flow improver, respectively. The phrase shall include blends, mixtures, complexes and reactions products of the paraffin inhibiting ionic liquid and second paraffin inhibitor, pour point depressing ionic liquid and second pour point depressant as well as cold flow improver ionic liquid and second cold flow improver.

The phrase "treatment compositions" shall be construed to mean any of the paraffin treatment composition", "pour point treatment composition" or "cold flow treatment composition".

As used herein, "petroleum hydrocarbon fluid" shall include crude oil, shale oil, shale gas condensate, bitumen, diluted bitumen (dil-bit), refinery fractions including distillates including gas oil cuts, finished fuel including diesel fuel, petroleum fuel and biofuel, finished petroleum products, residual oil, fuel gas, flare gas, propane, butane, liquefied petroleum gas (LPG), natural gas liquid (NGL) and combinations thereof. The ionic liquids and treatment compositions described herein are especially useful in the treatment of crude oil, bitumen, diesel fuel, petroleum fuel, biofuel, residual oil, fuel gas, flare gas, propane, butane, liquefied petroleum gas (LPG), natural gas liquid (NGL) and refinery fractions (including gas oil cuts and light lubricating oils) and combinations thereof. In addition, any of these may contain water, brines, gases such as hydrocarbon gases, or a combination thereof.

As used herein, the word "conduit" may refer to any pipeline, pipe, tubing, tubular, flow conduit, thoroughfare or other artery in which a chemical, including a petroleum hydrocarbon fluid, travels or contacts. The word "vessel" shall include any equipment or container in which a petroleum hydrocarbon fluid is in contact, such as heat exchangers, etc. The conduit may, but not limited to, those composed of a metal, plastic or glass. The site of the "conduit" or "vessel" shall include, but not be restricted to reservoirs, wells, pipelines, refineries, fluid processing or treatment facilities (including those where gas or oil production or treatment occur, chemical plants, thermal power stations, power plants, steel mills, natural gas processing plants, food processing plants, semi-conductor plants and HVAC systems) as well as thoroughfares leading to or from any of the above.

The PIPPCLI ionic liquids and treatment compositions described herein may be used (i) during the production of crude oil and gas; (ii) recovery of petroleum hydrocarbon fluids from underground reservoirs; (iii) in the treatment of a hydrocarbon stream obtained from a well; (iv) during a refinery operation of a hydrocarbon fluid including light-ends recovery; and (v) during storage and handling or product movement of hydrocarbon fluids.

The PIPPCLI ionic liquids and treatment compositions may be used within a conduit or vessel or introduced into a conduit or vessel. The PIPPCLI ionic liquids and treatment compositions may also be used during transit of hydrocarbon fluids or an industrial product as well as during storage of a hydrocarbon fluid or an industrial product.

The PIPPCFI ionic liquids and treatment compositions are typically liquid at relatively low temperatures. While the PIPPCFI ionic liquids are salts, they typically exhibit high flash points, good solvency for other chemicals and strong basicity.

In an embodiment, the PIPPCFL ionic liquid or treatment compositions may be added to a hydrocarbon fluid in the form of a solution or dispersion. The PIPPCFL ionic liquid or treatment compositions can be separately added to the hydrocarbon fluid. Alternatively, a PIPPCFL ionic liquid and second PIPPCFL can be combined to form the treatment compositions which is then contacted with the hydrocarbon fluid.

Generally the PIPPLC ionic liquid and treatment compositions are in an organic solvent, such as an aromatic solvent, especially an aromatic hydrocarbon such as xylene bottoms (including mesitylenes), kerosene, diesel fuel, naphthalenes and other heavy aromatics (preferably having a flash point in the range of from about 160° F. to about 350° F.) In an embodiment, the heavy aromatic solvent is a high boiling refinery product comprised of a varying mixture of principally aromatic compounds. The aromatic compounds which can be included in the heavy aromatic solvent include alkyl substituted benzene compounds wherein the alkyl substituents have about 1 to about 10 carbon atoms; naphthalene.

Suitable ionic liquids as PIPPFLI are those of the formula (I):

$$A^+X^- \quad (I)$$

wherein A is or contains nitrogen or phosphorus, a nitrogen containing heterocyclic ring or a phosphorus containing heterocyclic ring; and X is an anion selected from the group consisting of halides; hydroxyl; carbonates; alkyl carbonates; bicarbonates; anionic dithiocarbonates; anionic trithiocarbonates; xanthates, thiocyanates; anionic alkoxides; carboxylates; hydroxycarboxylates; amino fatty acids; anionic alkoxylated fatty acids; anionic metallic complexes, sulfur or silicon containing anions; anionic phosphate esters, anionic thiophosphate esters; anionic phosphonate esters; anionic thiophosphonate esters; alkyl substituted phosphines; anionic urea; anionic thiourea; anionic natural products; anionic thiols; anionic phenols; anionic phenol resins; anionic alkoxides; anionic copolymers of alpha olefins and maleic anhydride, esters, amides, imides or derivatives thereof; anionic acrylamido-methyl propane sulfonate/acrylic acid copolymers; anionic copolymers of olefins and vinyl acetate; anionic homopolymers, copolymers and terpolymers of one or more acrylates, methacrylates and acrylamides, optionally copolymerized with one or more ethylenically unsaturated monomers; anionic phosphated maleic copolymers; an anionic homo or copolymer of an oxirane or methyloxirane and mixtures thereof or a zwitterion.

In an embodiment cation A is of formula (I) is nitrogen or a nitrogen-containing heterocyclic ring; and anion X is selected from the group consisting of anionic metallic complexes; sulfur or silicon containing anions; anionic phosphate esters; anionic thiophosphate esters; anionic phosphonate esters; anionic thiophosphonate esters; anionic thiols; anionic natural products; anionic phenols; anionic phenol resins; anionic alkoxides; anionic copolymers of alpha olefins and maleic anhydride, esters, amides, imides or derivatives thereof or a mixture thereof; amino fatty acids; anionic alkoxylated fatty acids; alkyl substituted phosphines; anionic urea; anionic thiourea; anionic acrylamido-methyl propane sulfonate/acrylic acid copolymers; anionic homopolymers, copolymers and terpolymers of one or more acrylates, methacrylates and acrylamides, optionally copolymerized with one or more ethylenically unsaturated monomers; anionic copolymers of olefins and vinyl acetate; anionic phosphated maleic copolymers and mixtures thereof or a zwitterion.

Further, ionic liquids of formula (II) or (III) may be used as the PIPPCFI ionic liquid:

$$R^1R^2R^3R^4A^+X^- \quad (II); \text{ or}$$

$$R^1R^2R^3A^+R^8A^+R^5R^6R^7X^- \quad (III)$$

wherein:

A in formula (II) is or contains nitrogen or phosphorus or a heterocyclic ring thereof and wherein each A in formula (III) is independently selected from nitrogen or phosphorus or a heterocyclic ring thereof; and X is an anion selected from the group consisting of halides; hydroxyl; carbonates; alkyl carbonates; bicarbonates; carboxylates; hydroxycarboxylates; sulfonates; sulfates; bisulfites; dithiocarbonates; trithiocarbonates; xanthates, thiocyanates; carbamates; dithiocarbamates; sulfides; polysulfides; alkoxides; anionic urea; anionic alkyl substituted phosphines; anionic amino fatty acids; anionic alkoxylated fatty acids; anionic acrylamido-methyl propane sulfonate/acrylic acid copolymers; anionic phosphated maleic copolymers; anionic homo or copolymers of an oxirane or methyloxirane; anionic metal complexes; sulfur or silicon containing anions; anionic phosphate esters; anionic thiophosphate esters; anionic phosphonate esters; anionic thiophosphonate esters; anionic thiols; anionic natural products; anionic phenols; anionic phenol resins; anionic copolymers of alpha olefins and maleic anhydride, esters, amides, imides or derivatives thereof; anionic alkyl substituted phosphines; and anionic homopolymers, copolymers and terpolymers of one or more acrylates, methacrylates, acrylamides and acids, optionally copolymerized with one or more ethylenically unsaturated monomers; anionic copolymers of olefins and vinyl acetate; anionic oxirane and methyloxirane homo and copolymers; and mixtures thereof; and further wherein $R^1$, $R^2$, $R^3$, $R^4$, $R^5$, $R^6$ and $R^7$ are independently selected from the group consisting of hydrogen; benzyl; alkylbenzyl, or oxyalkyl (including —$CH_2CH_2OH$) or —$CH_2CH(CH_3)OH$); a straight or branched alkyl group, an alkylbenzyl group, an arylalkyl group, a straight or branched chain alkenyl group, a hydroxyalkyl group or a hydroxyalkylbenzyl group; and a polyoxyalkylene group; and $R^8$ is a straight or branched alkylene group, an alkylene oxyalkylene, or an alkylene polyoxyalkylene or a zwitterion; and further wherein R groups may be joined to form a heterocyclic nitrogen, sulfur or phosphorus containing ring.

In an embodiment, cation of (I), (II) or (III) is phosphorus or a phosphorus containing ring and X is an anion selected from the group consisting of hydroxyl; bicarbonates; alkoxides; hydroxycarboxylates; silicon containing anions; anionic amino fatty acids; anionic alkoxylated fatty acids; anionic thiophosphonate esters; alkyl substituted phosphines; anionic urea; anionic thiourea; anionic natural products; anionic phenols; anionic phenol resins; anionic copolymers of alpha olefins and maleic anhydride, esters, amides, imides or derivatives thereof; anionic acrylamido-methyl propane sulfonate/acrylic acid copolymers; anionic homopolymers, copolymers and terpolymers of one or more acrylates, methacylates and acrylamides, optionally copolymerized with one or more ethylenically unsaturated monomers; phosphated maleic copolymers; anionic copolymers of olefins and vinyl acetate, an anionic homo or copolymer of an oxirane or methyloxirane and mixtures thereof In another embodiment, cation A of formula (I), (II) or (III) is or contains nitrogen or a nitrogen heterocyclic ring and anion X is selected from the group consisting of silicon containing anions; anionic thiophosphonate esters; anionic natural products; anionic phenol resins; alkoxides; anionic copolymers of alpha olefins and maleic anhydride, esters, amides, imides or derivatives thereof or a mixture thereof; anionic amino fatty acids; anionic alkoxylated fatty acids; anionic alkyl substituted phosphines; anionic urea; anionic thiourea; anionic acrylamido-methyl propane sulfonate/acrylic acid copolymers; anionic homopolymers, copolymers and terpolymers containing acrylamide units; anionic phosphated maleic copolymers; anionic oxirane or methyloxirane homo or copolymers; and mixtures thereof.

In another embodiment, the ionic liquid represented by (II) or (III) has a cation A of is nitrogen (for II) and each A in (III) is nitrogen as defined herein and wherein X is an anion selected from the group consisting of anionic metallic complexes; sulfur or silicon containing anions; anionic phosphate esters; anionic thiophosphate esters; anionic phosphonate esters; anionic thiophosphonate esters; anionic thiols; anionic natural products; anionic phenols; anionic phenol resins; anionic copolymers of alpha olefins and maleic anhydride, esters, amides, imides or derivatives thereof amino fatty acids; anionic alkoxylated fatty acids; alkyl substituted phosphines; anionic urea; anionic thiourea; anionic acrylamido-methyl propane sulfonate/acrylic acid copolymers; anionic homopolymers, copolymers and terpolymers containing acrylamide units; anionic phosphated maleic copolymers; anionic copolymers of olefins and vinyl acetate; anionic homo and copolymers of oxirane and methyloxirane; and mixtures thereof; and further wherein $R^1$, $R^2$, $R^3$, $R^4$, $R^5$, $R^6$, $R^7$ and $R^8$ are as defined below; the R groups may be joined to form a heterocyclic nitrogen, sulfur or phosphorus containing ring.

Preferred ionic liquids are those of (III) having structures $R^1R^2R^3R^4N^+$; $R^1R^2R^3N^+R^8N^+R^5R^6R^7$; $S^+R^1R^2R^3$; $R^1R^2R^3R^4P^+$; and $R^1R^2R^3N^+R^4P^+R^5R^6R^7$.

In one preferred embodiment, anion X of (I), (II) or (III) is a hydroxide, anionic bicarbonate, anionic carbonate, anionic alkyl carbonate or an anionic alkoxide.

In a preferred embodiment, $R^1$, $R^2$, $R^3$, $R^4$, $R^5$, $R^6$ and $R^7$ of formula (II) and (III) are independently selected from the group consisting of a straight or branched $C_{1-30}$ alkyl group, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, a zwitterion (such as those from oxyalkylation of an amine with an alkylene oxide; or a polyoxyalkylene group; and $R^8$ is a straight or branched $C_{1-30}$ alkylene, an alkylene oxyalkylene, or an alkylene polyoxyalkylene or R groups may be joined to form a heterocyclic nitrogen, sulfur or phosphorus ring; and the anion comprises halides, hydroxide, bicarbonate, carbonate, alkyl carbonates, alkoxides, carboxylates, or a combination thereof; and further wherein $X^-$ is hydroxide, bicarbonate, carbonate, alkyl carbonates, alkoxides, carboxylates, or a combination thereof. In an exemplary embodiment, A of formula (II) or (III) is nitrogen or a nitrogen containing heterocyclic ring and anion X anion is a hydroxide, bicarbonate, carbonate, alkyl carbonate or an anionic alkoxide.

In another preferred embodiment, $R^1$, $R^2$, $R^3$, $R^4$, $R^5$, $R^6$ and $R^7$ of (II) and (III) are independently —H or a $C_{1-20}$ alkyl; wherein at least one (or at least two) of $R^1$, $R^2$, $R^3$, $R^4$, $R^5$, $R^6$ and $R^7$ is a $C_{2-20}$ alkyl, preferably a $C_{6-12}$ alkyl.

Exemplary ionic liquids of formulas (I), (II) and (III) include, but are not limited to, those ionic liquids having a cation of dicocodimethyl ammonium and ditallowdimethyl ammonium. Further specific exemplary ionic liquids are dicocodimethyl ammonium hydroxide, benzyltrimethylammonium hydroxide, ditallowdimethyl ammonium hydroxide, tributylmethylammonium methyl carbonate, tetraethylammonium bicarbonate, tetrapropylammonium hydroxide, coco dimethylethylammonium methyl carbonate, dodecyl trimethylammonium hydroxide, (2-hydroxyethyl) cocoalkyl ammonium hydroxide (including dialkyl, trialkyl, tetralkyl derivatives like dicocodimethyl ammonium hydroxide cocotrimethyl ammonium hydroxide), cocodialkylammonium chloride derivatives (such as (oxydi-2,1-ethanediyl) bis(cocodimethylammonium) chloride), tri-n-butyl methylammonium methyl carbonate, tetrabutylammonium hydroxide, tallowtrimethyl ammonium hydroxide, cocotrialkyl ammonium hydroxide (such as cocotrimethyl ammonium hydroxide), cocodialkylammonium chloride derivatives (such as (oxydi-2,1-ethanediyl) bis(cocodimethylammonium) chloride), hydrogenated tallow trimethyl ammonium hydroxide, dihydrogenated tallow dimethyl ammonium hydroxide, oxydiethylene bis(cocodimethylammonium hydroxide having a structure represented by the formula: $Coco(CH_3)_2N^+(CH_2)_2O(CH_2)_2N^+(CH_3)_2Coco\ (OH^-)_2$ or a combination comprising at least one of the foregoing.

In some instances, the cation of (III) may be a polyamine, meaning the cation may have two or more nitrogen atoms (and in some cases up to 5 nitrogen atoms). In some instances, one or more of the nitrogens of the polyamine may be cationic such that the cation of (III) may be a polyamine containing two or more cationic sites (and in some cases up to 5 cationic sites). In such cases, $R^8$ may correspond to $(-NR^1R^2)_y$ or $(-NR^1R^2R^3)_y$ wherein y corresponds to 1, 2 or 3 to render the number of nitrogen sites and $R^1$, $R^2$ and $R^3$ are as defined above. Specifically, y is 1 when A is a triamine, y is 2 when A is a tetraamine and y is 3 when A is a pentaamine. Exemplary are cations of diethylenediamine, triethylenetetraamine, tetraethylenepentamine and (bis) hexamethylenetriamine. In other instances, where both of A are phosphorus in (III), the cation may consist of multiple cationic sites on the phosphorus wherein $R^8$ may correspond to $(-PR^1R^2)_y$ or $(-PR^1R^2R^3)_y$ wherein y corresponds to 1, 2 or 3 to render the number of phosphorus sites and $R^1$, $R^2$, nd $R^3$ are as defined above.

As used herein, the term "alkyl" refers to a straight or branched chain, saturated monovalent hydrocarbon group regardless whether straight or branched chain is specifically mentioned or not; "aryl" refers to an aromatic monovalent group containing only carbon in the aromatic ring or rings; "arylalkyl" refers to an alkyl group that has been substituted with an aryl group, with benzyl being an exemplary arylalkyl group; "alkylbenzyl" refers to a benzyl group that has been substituted with an alkyl group in the aromatic ring; "hydroxyalkyl" refers to an alkyl group that has been substituted with a hydroxyl group with 2-hydroxyethyl as an exemplary hydroxyalkyl group; "hydroxyalkylbenzyl" refers to a benzyl group that has been substituted with a hydroxyalkyl group as defined herein in the aromatic ring; "alkylene" refers to a straight or branched chain, saturated, divalent hydrocarbon group, and "alkenyl" refers to a straight or branched chain monovalent hydrocarbon group having at least two carbons joined by a carbon-carbon double bond. The term "substituted" as used herein means that at least one hydrogen on the designated atom or group is replaced with another group, provided that the designated atom's normal valence is not exceeded. Substituted with a group means substituted with one or more groups.

Suitable nitrogen containing heterocyclic rings referenced herein include pyridinium, imidazolinium and a pyrrole cation (including alkylated derivatives thereof). Further reference to "nitrogen" shall include nitrogen containing cations such as an oxyalkylated nitrogen.

In an embodiment, the cation of (I), (II) or (III) is a quaternary amine salt, triethanolamine methyl chloride, oxyalkylated amine, polyamine, oxyalkylated polyimine, cationic melamine acid colloids or an oxyamine such as those of the formula $(CH_3)_2N(CH_2)_xOH$ where x is 1 to 6, preferably 2.

As used herein, a polyoxyalkylene group has a formula

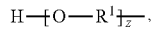

where each occurrence of $R^1$ is independently a $C_{1-10}$ alkylene or $C_{2-8}$ alkylene, specifically ethylene, propylene, butylene, or a combination thereof, and z is an integer greater than 1 such as 2 to 30, 4 to 25, or 8 to 25.

An alkylene polyoxyalkylene group has a formula

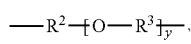

wherein $R^2$ is a $C_{1-30}$ alkylene, each occurrence of $R^3$ is independently a $C_{1-10}$ alkylene or $C_{2-6}$ alkylene, specifically ethylene, propylene, butylene, or a combination thereof, and y is an integer from 1 to 500, such as 2 to 30, 4 to 25, or 8 to 25.

An alkylene oxyalkylene group has a formula of $-R^7-O-R^8-$, wherein $R^7$ and $R^8$ are each independently a $C_{1-20}$, or $C_{1-10}$, or $C_{1-5}$ branched or straight chain alkylene. Optionally, $R^7$ and $R^8$ can be ethylene.

Exemplary halides for the anion $X^-$ are $-Cl$, $-Br$, $-F$ and $-I$. In an embodiment $-Cl$ is preferred.

Suitable sulfur and phosphorus containing anions include sulfates ($SO_4^-$), bisulfate ($HSO_4^-$), thiocyanate ($SCN^-$), thiocarbonate

dithiocarbamates

wherein $R_1$ and $R_2$ are independently selected from $C_{1-20}$ alkyl groups, xanthates

wherein R is a $C_{1-20}$ alkyl, sulfides ($RS^-$) wherein R is a $C_{1-20}$ alkyl, anionic polysulfides ($RS(S)_xS^-$) wherein R is a $C_{1-20}$ alkyl and x is one to five, anionic phosphate esters [$ROP(=O)(OH)_2$] and anionic phosphonate ester [$R-P(=O)(OH)_2$ (wherein R is a $C_{1-20}$ alkyl or a $C_{1-20}$ oxyalkyl-(RO—); anionic thiophosphate esters

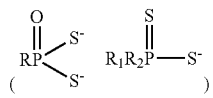

as well as anionic thiophosphonate esters (wherein R is a $C_{1-20}$ alkyl or a $C_{1-20}$ oxyalkyl-(RO—); sulfonates ($RSO_3^-$) wherein R is $C_{1-20}$ alkyl or aryl or alkylaryl group; and anionic thiols (RSH) where R is $-(CH)_xH$ and x is from 1 to 4.

Exemplary oxirane or methyloxirane homo or copolymers include those containing units of the structure $-(CH_2CH_2O)_xCH_2CH(CH_3)O)_y$, where x and y are independently selected from 1 to 1500.

Exemplary anionic metal complexes in formulae (I), (II) and (III) may include, but not be limited to Fe (such as Fe containing anions like $FeCl_4^-$), aluminum (such as Al containing anions like $AlCl_4^-$), etc. Further, the anionic metal complex may be formed from copper, zinc, boron, tin and mixtures thereof.

The anion may further be an anionic natural product like anions of a polysaccharide, polyphenol or lignin. Suitable anions of polysaccharides include anionic starches (such as mixtures of amylose and amylopectin), anionic polyphenols (such as anionic flavonoids or anionic natural polyphenols and anionic tannins (such as water soluble anionic polyphenols with a molecular weight between 500 and 3,000).

Suitable anions may also be anionic phenolics such as anionic phenols, anionic alkyl substituted phenols, anionic phenol oxyalkylates, anionic alkyl substituted phenol oxyalkylates, anionic phenolic or alkylphenol resins and anionic phenol resin oxyalkylates. Typically, the alkyl groups of the anionic phenolics are $C_{1-28}$.

The anion may also be an anionic alkoxide. Suitable anionic alkoxides include those of the formula RO— where R is a $C_{1-30}$ alkyl or cycloalkyl group. In an embodiment, R is $C_{1-18}$ alkyl, $C_{6-12}$ aryl, or $C_{5-12}$ cycloalkyl. Exemplary alkoxides are tert-butoxide, n-butoxide, isopropoxide, n-propoxide, isobutoxide, ethoxide, methoxide, n-pentoxide, isopentoxide, 2-ethylhexoxide, 2-propylheptoxide, nonoxide, octoxide, decoxide and isomers thereof. Preferably, the alkoxides are tert-butoxide, isopropoxide, ethoxide, or methoxide. Tert-butoxide and methoxide are specifically mentioned. The anionic alkoxides may further be anionic ethylene or propylene oxide homopolymers, anionic copolymers or terpolymers (which may optionally be cross-linked). Suitable crosslinking agents include bisphenol A or maleic anhydride.

Suitable alkyl carbonates are those of the formula $ROCO_2^-$, where R is a halogenated or non-halogenated linear or branched alkyl, or hydroxyl alkyl group, preferably a halogenated or non-halogenated linear or branched $C_{1-8}$ or $C_{1-5}$ alkyl group.

Exemplary carboxylates include formate, acetate, propionate, benzoate, n-butyrate, isobutyrate, and pivalate. Exemplary hydroxycarboxylates include octanoate, laurate, glycolate, lactate, citrate, glucarate and gluconate as well as $C_{18}$ fatty acids such as oleate, linolate and stearate.

Suitable anionic copolymers of alpha olefins and maleic anhydride, esters, amides, imides (and derivatives thereof) include those of the general structure

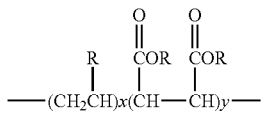

where R is a $C_{1-30}$ alkyl group.

Suitable alkyl carbonates, carboxylates, anionic metal complexes, anionic natural products, anionic phenolics, alkoxides, anionic alpha olefin/maleic anhydride polymers, anionic polymers of acrylates, methacrylates and acrylamides and nitrogen and sulfur cations are those referenced in the paragraphs above.

The PIPPCFI ionic liquids and treatment compositions disrupt the change in morphology of the wax crystals present in petroleum fuel or crude oil and retard further crystal growth, thereby altering the crystallization point of the petroleum fuel or crude oil. Further, when introduced into petroleum hydrocarbon fluids, the PIPPCFI ionic liquids and treatment compositions improve flow and transportation of the fuel through conduits by inhibiting or preventing the formation of paraffin deposits and agglomerates.

The ionic liquids of (I), (II), and (III) are salts having a melting point range of −100° C. to 200° C., typically below 100° C. They are generally non-volatile and exhibit low vapor pressures and are environmentally more benign than other organic solvents, such as volatile aromatics and alkanes. They are thermally stable over a wide temperature range with some having a liquid range of up to 300° C. or higher. Typically they are molten salts of organic compounds or eutectic mixtures of organic and inorganic salts. Stability and other fundamental physical properties of the ionic liquids are influenced by the selection of cation while the selection of anion generally determines the functionality of the ionic liquid.

In an exemplary embodiment, ionic liquids disclosed herein may be prepared by first forming a quaternary salt followed by ion exchange with an acid or salt or by an anionic metathesis reaction with an appropriate anion source to introduce the desired counter anion. As an example, a nitrogen or phosphorus containing heterocyclic compound (such as an imidazole or pyridine) may first react with an alkylating agent to form the quaternary salt. The alkylating agent may be an alkyl chloride providing a broad range of alkyl groups on the nitrogen including straight and branched or cyclic $C_1$-$C_{20}$ alkyl groups. The quaternary salt may then be subjected to ion exchange with an acid or salt to form the ionic liquid. Typically, no other work-up is required. Any water formed in the reaction may be removed by distillation, if desired.

Ionic liquids (I), (II) and (III) may be tailored by varying the cation and anion pairing may be combined with a treatment agent to form a treatment composition.

A treatment composition may be formed by contacting any of the PIPPCFI ionic liquids of formula (I), (II) or (III) with a second PIPPCFI. The treatment composition may consist of the second PIPPCFI and a PIPPCFI ionic liquid wherein anion X of the PIPPCFI ionic liquid and the counter-anion of the second PIPPCFI are the same. Likewise, a treatment composition may consist of the second PIPPCFI ionic liquid and PIPPCFI ionic liquid where the cation of the PIPPCFI ionic liquid is the same as the counter-cation of the second PIPPCFI.

PIPPCFI ionic liquids of formulas (I), (II) and (III) and treatment compositions effectively disperse paraffin as it is formed into the hydrocarbon fluid. As such, PIPPCFI ionic liquids and treatment compositions keep liquid fuel from losing fluidity. When in contact with petroleum hydrocarbon fluids, flow of the petroleum hydrocarbon fluid through conduits and transportation and storage of petroleum hydrocarbon fluids is not disrupted.

The treatment composition formed by contacting the PIPPCLI ionic liquid with a second PIPPCLI has been noted to provide synergy as their effectiveness in disrupting the formation of paraffin deposits and increasing dispersement of paraffin into the hydrocarbon fluid are higher compared to the PIPPCLI ionic liquid or the PIPPCLI by themselves.

Thus, paraffin inhibition has been noted to significantly improve when a second paraffin inhibitor is in contact with a paraffin inhibiting ionic liquid. In such instances, the paraffin inhibiting ionic liquid may be viewed as a promoter for the second paraffin inhibitor. In one non-limiting example, the presence of the paraffin inhibiting ionic liquid in a paraffin treatment composition decreases paraffin precipitation and wax crystal formation of the second paraffin inhibitor (as well as the paraffin inhibiting ionic liquid) by at least 25% and sometimes 50% or higher compared to when the second paraffin inhibitor or the paraffin inhibiting ionic liquid is used by themselves.

A pour point treatment composition formed by contacting a pour point depressing ionic liquid with a second pour point depressant has been noted to provide synergy, i.e., the amount of depression of the pour point significantly improves when the second pour point depressant is in contact with the pour point depressing ionic liquid. In such instances, the pour point depressing ionic liquid may be viewed as a promoter for the second pour point depressant.

A cold flow treatment composition formed by contacting a cold flow improver ionic liquid with a second cold flow improver has been noted to provide synergy, i.e., fluidity of a hydrocarbon fluid significantly improves when the second cold flow improver is in contact with the cold flow improver ionic liquid. In such instances, the cold flow improver ionic liquid may be viewed as a promoter for the second cold flow improver.

The PIPPLC and treatment compositions are preferably a liquid material. If it is a solid, it may be dissolved in a suitable solvent, thus making it a liquid.

The ionic liquids and/or treatment compositions described herein may exhibit multiple functions. For instance, a paraffin inhibitor may function as a pour point depressant; a paraffin inhibitor may function as a cold flow improver; a pour point depressant may function as a cold flow improver, etc.

Flow and transportation of hydrocarbon liquids (including petroleum fuels and crude oil) through tubing, flow lines and pumps is not impeded by use of the PIPPCFI ionic liquids. The PIPPCFI ionic liquids and treatment agents are particularly useful for hydrocarbon fluids in cold climates and under winter conditions. In an embodiment, the PIPPCFI ionic liquids and treatment compositions are especially suitable for lowering the pour point of solutions of paraffin hydrocarbons as much as 30° C. In an embodiment, the PIPPCFI and treatment compositions permit hydrocarbon fluids to remain fluid and pumpable at temperatures ranging from about −40° C. to about 70° C.

The PIPPCFI ionic liquid may further be used in lubricating oils, such as naphthenic or paraffinic lubricating oils.

PIPPCFL ionic liquids and treatment compositions may be contacted with a hydrocarbon-containing stream under severe conditions of heat, pressure, agitation and/or turbulence.

The PIPPCFL ionic liquid and treatment compositions have particular applicability during the production of petroleum hydrocarbon fluids from underground reservoirs as they improve the quantity and quality of recovered petroleum hydrocarbon fluids. They enhance productivity of the reservoir to produce hydrocarbons and reduce damage to conduits and vessels. Any known method of introducing the PIPPCFL ionic liquid or treatment composition into the reservoir can be used.

The PIPPCFL ionic liquid or treatment composition also have particular applicability in the refining of petroleum hydrocarbon fluids as well as in other applications where the deposition of contaminants presents severe operation problems and quality of produced fluids.

The PIPPCFL ionic liquid and treatment compositions further are of particular value in the transport of hydrocarbon fluids from reservoirs through conduits. Contacting of the PIPPCFL ionic liquid or treatment composition with hydrocarbon fluid can be during the production of hydrocarbon fluids, during refining of hydrocarbon fluids, during transport or storage of the fluids or during any period in between.

Generally, the amount of a PIPPCFI ionic liquid or treatment composition added to a hydrocarbon fluid is about 1 ppm to about 5,000 ppm, or about 1 ppm to about 500 ppm, or about 5 ppm to about 150 ppm. The amount employed may be dependent on the paraffin content of the liquid hydrocarbon.

In some embodiments, the PIPPLC ionic liquid and/or treatment compositions are added to crude oil below ground or in a subterranean reservoir. For instance, the PIPPCFL ionic liquid or treatment composition may be delivered into a reservoir by downhole squeezing wherein a slug of the PIPPCFL ionic liquid or treatment composition is injected into the well (such as through the annulus) and returned with the produced fluid. Such an application may be preferred, for instance, where the PIPPCFL ionic liquid or treatment composition can also function as a scale inhibitor. In some embodiments, the PIPPLC ionic liquid is added to the crude oil by introducing it into the crude oil via a capillary string. In an embodiment, the PIPPLC ionic liquid or treatment composition is added to the crude oil via an annulus of a downpipe which is in communication with a subterranean oil reservoir. In some embodiments, the PIPPLC ionic liquid or treatment composition is added above ground or to the crude oil after the crude oil emerges from the subterranean reservoir. In one embodiment, the PIPPLC ionic liquid or treatment compositions is added to crude oil in an oil processing operation such as oil refining.

The PIPPLC ionic liquid or treatment composition can also be added to the hydrocarbon fluid at any point in the recovery, extraction, processing, transportation, and/or storage of the crude oil.

The PIPPCFL ionic liquid and treatment composition defined herein are further effective inhibitors and fluidity modifiers during the storage and transportation of hydrocarbon fluids including transportation of the fluid through pipelines. The PIPPLC ionic liquids and treatment compositions may be added to the hydrocarbon fluid in before or during storage of the hydrocarbon fluid such as a storage tank, transit vessel, conduit or vessel, processing unit, refinery stream and the like.

Generally, polymeric crystal modifiers have a weight average molecular weight of about 3,000 to about 10,000, preferably about 5,000 to about 10,000.

Preferred wax crystal modifiers include ethylene vinyl acetate copolymers, maleic olefin alkyl esters, acrylate esters, methacrylic esters, and mixtures thereof including homopolymers and copolymers of $C_6$-$C_{24}$ linear esters of acrylic and methacrylic acids and $C_{20}$ alpha olefin-maleic copolymers esters of $C_{16}$-$C_{24}$ linear alcohols and $C_{16}$-$C_{28}$ para-substituted phenol formaldehyde resins.

Preferred are polymeric wax crystal modifiers such as those selected from ethylene/vinyl acetate copolymers, homopolymers and copolymers of acrylate esters, phenol-aldehyde resins and olefin/maleic esters copolymers.

Other preferred wax crystal modifiers are homopolymers and copolymers of $C_6$-$C_{24}$ linear esters of acrylic and methacrylic acids and $C_{20}$ alpha olefin-maleic acid copolymers, esters of $C_{16}$-$C_{24}$ linear alcohols and $C_{16}$-$C_{28}$ para-substituted phenol formaldehyde resins, copolymers of maleic anhydride and α,β-unsaturated compounds (optionally reacted with primary monoalkylamines and/or aliphatic alcohols) (such as maleic anhydride ester polymers), dodecyl benzene sulfonate, the products of the reaction of alkenylspirobislactones with amines and products formed by the reaction α,β-unsaturated dicarboxylic anhydrides, α,β-unsaturated compounds and polyoxyalkylene ethers.

In a preferred embodiment, preferred paraffin inhibitor/wax crystal modifiers contacted with the ionic liquid are ethylene-vinyl acetate copolymers such as those of structure (I):

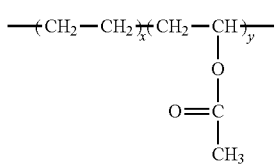

(I)

wherein x is from 1 to about 100 and y is from about 1 to about 100; alpha olefin-maleic anhydride copolymer esters such as those of structure (II):

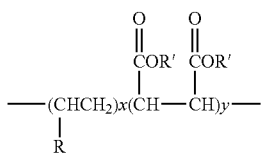

(II)

wherein R is a $C_{18}$ to $C_{30}$ alkyl group and R' is —H or $C_{18}$ to $C_{28}$ alkyl group, and phenol formaldehyde resins (such as those referenced as asphaltene inhibitors above).

In a preferred embodiment, the anion of the ionic liquid of (I), (II) or (III) may be an anionic phenol resin such as an anionic phenol aldehyde resin or a blend of anionic phenol aldehyde resins with amine or polyamine additives. The anionic phenol aldehyde resin may include polymers or oligomers derived from substituted-monophenols or unsubstituted-monophenols and an aldehyde. The monophenol substituents can be attached to the para, ortho, or both positions of the monophenol. Preferably the substituents are attached to the para position of the monophenol. The substituted monophenol can be an alkyl substituted monophenol. The alkyl substituents include $C_{1-20}$, $C_{4-18}$, or $C_{4-12}$ branched or linear alkyl groups. The anionic phenol aldehyde resin can be derived from a single substituted-monophenol or from combinations of two or more different substituted-monophenols or unsubstituted monophenol and an aldehyde. The molar ratio of the two or more different substituted-monophenols or unsubstituted monophenol are not particularly limited.

Exemplary anionic phenols having branched alkyl groups include anionic branched dodecyl phenol, branched nonyl phenol, tert-butylphenol, t-amyl phenol, and branched hexyl phenols such as 4-(1-methylpentyl) phenol, 4-(1,2-dimethylbutyl)phenol, and 4-(1-ethylbutyl) phenol, and 4-(1-ethyl-2-methylpropyl) phenol.

Exemplary aldehydes include formaldehyde, paraformaldehyde, acetaldehyde, propionaldehyde, butyraldehyde, glyoxal, glutaraldehyde, 1,9-nonanedial, or a combination comprising at least one of the foregoing. Formaldehyde is specifically mentioned.

In an embodiment, the anionic phenol aldehyde resin may be derived from formaldehyde and a single substituted monophenol are of structure (III):

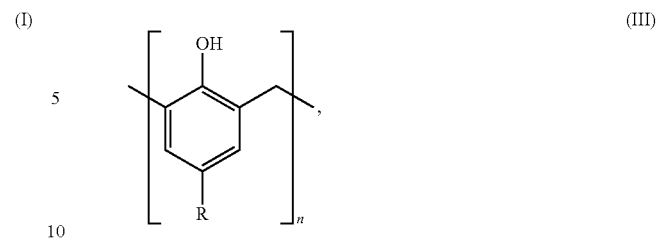

(III)

wherein R is —H, $C_{1-20}$, $C_{4-18}$, or $C_{4-12}$ branched or linear alkyl groups, and n is an integer of greater than 1, typically greater than 2.

When the anionic phenol aldehyde resins are derived from two alkyl-substituted monophenols (or phenol with one alkyl-substituted monophenol) and formaldehyde, the phenol aldehyde resins can have structure (IV):

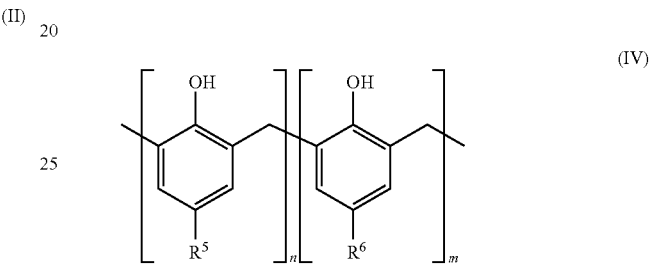

(IV)

wherein $R^5$ is a $C_{1-20}$ linear or branched alkyl, $R^6$ is different from $R^5$ and is H or a linear or branched $C_{1-20}$ alkyl, n and m are integers greater than 1. In an embodiment, $R^5$ is a $C_{7-16}$ linear or branched alkyl and $R^6$ is a $C_{1-20}$, typically a $C_{1-6}$, linear or branched alkyl. The value of n:m can vary broadly, for example about 99:1 to about 1:99, about 1:20 to about 20:1, or about 1:10 to about 10:1. Optionally in some embodiments, the value of n:m can be about 1:5 to about 5:1. Optionally in other embodiments, the value of n:m can be about 1:2 to about 2:1.

Further, where a treatment composition is formed from the PIPPCFI ionic liquid of formula (I), (II) or (III) and a second PIPPCFI, the counter cation or anion of the PIPPCFI ionic liquid may be the same cation or anion of the second PIPPCFI.

The PIPPCFL ionic liquids and treatment compositions are effective as pour point depressants by lowering pour points as much as 30° C. As such, the PIPPCFL ionic liquid and treatment compositions are effective in retarding the formation of paraffin crystal precipitates while the hydrocarbon fluid remains fluid over a range of temperatures from −40° C. to 70° C. The PIPPCFL ionic liquids and treatment compositions are effective in the inhibition of paraffin crystal precipitates, while remaining fluid over a range of temperatures from −40° C. to 70° C. In an embodiment, the PIPPCFL ionic liquids and treatment compositions remain as liquids at a temperature of 0° C.

The ionic liquids of formula (I), (II) and (III) and cold flow improver composition are especially useful as cold flow agents (fluidity modifiers). A cold flow property of distillate fuels, especially jet fuel, kerosene, heating oil and diesel fuel, may be improved by the addition thereto of the ionic liquid or cold flow improver composition.

An exemplary cold flow property improved by the ionic liquids and treatment compositions is the cold filter plugging point (CFPP), defined as the lowest temperature at which a given volume of a fuel still passes through a standardized filtration device in a specified time when cooled under certain conditions. The fluidity of the distillate may be improved by inhibiting the deposition of agglomeration of paraffins in the fuel that plugs pipes and filters which thereby inhibits the transmission of the fuel to an engine.

By inhibiting the deposition of paraffin from hydrocarbon fluids, the PIPPCFI ionic liquids and treatment compositions improve the flow properties of the hydrocarbon fluid. The cold flow properties of middle distillates are often improved by adding chemical additives known as cold flow improvers or flow improvers, which modify the crystal structure and agglomeration tendency of the paraffins which precipitate out such that the oils thus additized can still be pumped and used at temperatures which are often more than 20° C. lower.

In a preferred embodiment, the cold flow improvers used are oil-soluble copolymers of ethylene and unsaturated esters The selection and composition of the cold flow improver ionic liquid and cold flow treatment composition is based on the nature of the paraffins in the fuel such that the fluidity modifier can properly affect the crystal growth of the paraffins in the treated fuel. The cold flow improver ionic liquids and cold flow treatment composition then co-crystallizes with or adsorbs paraffins in the fuel and precipitates the paraffin before agglomeration occurs.

Typically, the fluidity modifier is coordinated with the paraffins in the fuel in order for solubility characteristics of the modifier to match the solubility characteristics of the paraffins. Thus, if the fuel to be treated contains $C_{20-24}$ paraffins that crystallize at 10° F. (−12° C.), the modifier will be chosen to crystallize at about 10° F. (−12° C.) as well to interfere with the crystallization of the paraffins. It is recognized by those of skill in the art to select and adjust the aliphatic chain length of the fluidity modifier to balance overall solubility (based on the paraffin content of the fuel) to cause the modifier to precipitate out of the fuel at the desired temperature with the paraffin. The fluidity modifier can then co-crystallize with or adsorb the paraffins in the fuel to precipitate the paraffin before agglomeration occurs or alternatively to modify paraffin crystal growth so that the resulting irregularity in size and shape of the crystals inhibits agglomeration or efficient packing of the crystals.

Preferred ionic liquids as cold flow improver ionic liquids are those having the counter anion of polymerized alpha-olefins; alpha-olefins copolymerized or reacted with a second component selected from the group consisting of maleic anhydride, acrylic acid, vinyl acetate, alkyl acrylates, methacrylic acid, alkyl methacrylates, and combinations; alpha-olefins copolymerized or reacted with a second component selected from the group consisting of maleic anhydride, acrylic acid, vinyl acetate, alkyl acrylates, methacrylic acid, alkyl methacrylates, and combinations thereof (optionally blended with alkylphenol-formaldehyde resins); and alpha-olefins copolymerized or reacted with a second component selected from the group consisting of maleic anhydride, acrylic acid, vinyl acetate, alkyl acrylates, methacrylic acid, alkyl methacrylates, and combinations thereof (optionally blended with alkylphenol-formaldehyde resins an ethylene-vinyl acetate copolymer).

The polymer PIPPCFI ionic liquids as well as the treatment compositions may be used alone or in combination with other well treatment additives conventionally used in the production, recovery or treatment of a hydrocarbon fluid produced or originating from a gas or oil well. These include dewaxing auxiliaries, corrosion inhibitors, asphaltene inhibitors, scale inhibitors, antioxidants, lubricity additives, dehazers, conductivity improvers, cetane number improvers, sludge inhibitors, etc.

EXAMPLES

All percentages set forth in the Examples are given in terms of weight units except as may otherwise be indicated.

Ionic liquids were prepared for use as cold flower improvers by reacting about 2 grams of a quaternary ammonium hydroxide (di-hydrogenated tallow dimethylammonium hydroxide or dodecyltrimethylammonium hydroxide) with 10 grams of a copolymer of an olefin and maleic anhydride esterified with $C_{18}$ and behenyl alcohols [pour point additive ("PPD")] and then heating the mixture overnight in an oven at 60° C. The reaction may be represented by the following:

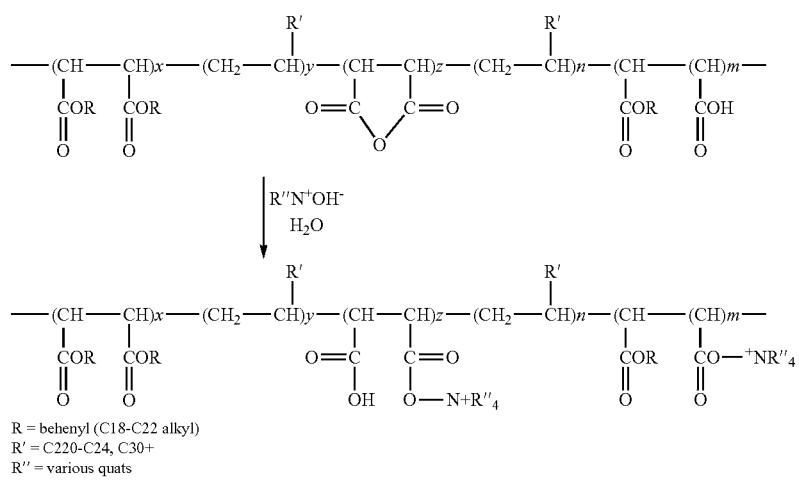

R = behenyl (C18-C22 alkyl)
R' = C220-C24, C30+
R'' = various quats

Performance testing of the derivative was performed by dosing the hydrocarbon with the listed dose rate and heating the samples to 140° F. in a water bath for 1 hour to melt any wax present. The samples were shaken for 1 minute and then the pour point of the treated sample was determined by using the protocol of ASTM D5950. The results are set forth in Table IV.

TABLE IV

| Sample | Additive | Dose (ppm) | Pour Pt (° F.) |
|---|---|---|---|
| Gas Oil | Untreated | — | 95 |
| Gas Oil | PPD | 1000 | 85 |
| Gas Oil | PPD/DTAH | 1000 | 55 |
| Etame crude | Untreated | — | 85, 90 repeat |
| Etame crude | PPD | 3000 | 80, 75 repeat |
| Etame crude | PPD/2HT-75 | 3000 | 70 |
| Etame crude | PPD/DTAH | 2500 | 60 |
| Etame crude | PPD/sTrimethyl cocoammonium hydroxide | 2500 | 65 |

2HT-75 = di-hydrogenated tallow dimethylammonium hydroxide,
DTAH = dodecyltrimethylammonium hydroxide While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended embodiments, and may be made and used by one of ordinary skill in the art without departing from the spirit or teachings of the disclosure and scope of appended embodiments. Thus, all matter herein set forth should be interpreted as illustrative, and the scope of the disclosure and the appended embodiments should not be limited to the embodiments described and shown herein.

What is claimed is:

1. A method of modifying the pour point or cold flow of crude oil or gas, or reducing the deposition of paraffin from crude oil or gas, during production of the crude oil or gas from a subterranean reservoir, the method comprising:
   (a) adding to the produced crude oil or gas in the subterranean reservoir an ionic liquid of the formula:

$$A^+X^-$$ (I)

wherein:
   A is or contains nitrogen; and
   X is an anion selected from the group consisting of anionic copolymers of alpha olefins and maleic anhydride, esters, amides, imides or derivatives thereof; anionic acrylamido-methyl propane sulfonate/acrylic acid copolymers; anionic homopolymers, copolymers and terpolymers of one or more acrylates, methacrylates and acrylamides, optionally copolymerized with one or more ethylenically unsaturated monomers; anionic phosphated maleic copolymers; an anionic homo or copolymer of an oxirane or methyloxirane; anionic copolymers of ethylene and vinyl acetate; and mixtures thereof or a methyl oxirane; and
   (b) retarding, delaying, minimizing, reducing, inhibiting or preventing phase separation of paraffin wax formed in the crude oil or gas by dispersing the paraffin wax in the crude oil or gas containing the ionic liquid in the subterranean reservoir; or enhancing fluidity of the crude oil or gas while flowing the crude oil or gas containing the ionic liquid from the subterranean reservoir through a conduit; or depressing the pour point of the crude oil or gas in the subterranean reservoir when the crude oil or gas contains paraffin wax and further contains the ionic liquid.

2. The method of claim 1, wherein anion X is selected from the group consisting of anionic acrylamido-methyl propane sulfonate/acrylic acid copolymers; anionic homopolymers, copolymers and terpolymers of one or more acrylates, methacylates and acrylamides, optionally copolymerized with one or more ethylenically unsaturated monomers; anionic ethylene vinyl acetate copolymers; anionic phosphated maleic copolymers and mixture thereof or a zwitterion.

3. A method of modifying the pour point or cold flow of crude oil or reducing the deposition of paraffin from the crude oil during production of the crude oil from an underground reservoir, the method comprising:
   (a) adding to the crude oil in the underground reservoir an ionic liquid of the formula:

$$R^1R^2R^3A^+R^8A^+R^5R^6R^7X^-$$ (III)

wherein:
   each A in formula (III) is or contains nitrogen; and
   X is an anion selected from the group consisting of halides; hydroxyl; carbonates; alkyl carbonates; bicarbonates; carboxylates; hydroxycarboxylates; sulfonates; sulfates; bisulfites; thiocyanates; dithiocarbonates; trithiocarbonates; carbamates; dithiocarbamates; xanthates; sulfides; polysulfides; alkoxides; anionic urea; anionic alkyl substituted phosphines; anionic amino fatty acids; anionic alkoxylated fatty acids; anionic acrylamido-methyl propane sulfonate/ acrylic acid copolymers; anionic phosphated maleic copolymers; anionic metal complexes; sulfur or silicon containing anions; anionic phosphate esters; anionic thiophosphate esters; anionic phosphonate esters; anionic thiophosphonate esters; anionic thiols; anionic natural products; anionic phenols; anionic phenol resins; anionic copolymers of alpha olefins and maleic anhydride, esters, amides, imides or derivatives thereof; anionic alkyl substituted phosphines; and anionic homopolymers, copolymers and terpolymers of one or more acrylates, methacrylates acrylamides and acids, optionally copolymerized with one or more ethylenically unsaturated monomers; anionic homo and copolymers of oxirane and/or methyloxirane; anionic copolymers of olefins and vinyl acetate; and mixtures thereof; and further wherein $R^1$, $R^2$, $R^3$, $R^4$, $R^5$, $R^6$ and $R^7$ are independently selected from the group consisting of hydrogen; benzyl; alkylbenzyl, or oxyalkyl; a straight or branched alkyl group, an alkylbenzyl group, an arylalkyl group, a straight or branched chain alkenyl group, a hydroxyalkyl group or a hydroxyalkylbenzyl group; and a polyoxyalkylene group; and $R^8$ is a straight or branched alkylene group, an alkylene oxyalkylene, or an alkylene polyoxyalkylene or a zwitterion; and further wherein R groups may be joined to form a heterocyclic nitrogen, sulfur or phosphorus containing ring; and
   (b) retarding, delaying, minimizing, reducing, inhibiting or preventing phase separation of paraffin wax formed in the crude oil by dispersing the paraffin wax in the crude oil containing the ionic liquid in the subterranean reservoir; or enhancing fluidity of the crude oil while flowing the crude oil containing the ionic liquid from the subterranean reservoir through a conduit; or depressing the pour point of the crude oil in the subterranean reservoir when the crude oil contains paraffin wax and further contains the ionic liquid.

4. The method of claim 3, wherein $R^1$, $R^2$, $R^3$, $R^4$, $R^5$, $R^6$ and $R^7$ are independently selected from the group consisting of hydrogen; benzyl; oxyalkyl; a straight or branched $C_{1-30}$ alkyl group; a $C_{7-30}$ alkylbenzyl group; a $C_{7-30}$ arylalkyl group; a straight or branched $C_{3-30}$ alkenyl group; a $C_{1-30}$ hydroxyalkyl group; a $C_{7-30}$ hydroxyalkylbenzyl group; and a polyoxyalkylene group and further wherein R groups may be joined to form a heterocyclic nitrogen or phosphorus containing ring; and $R^8$ is a straight or branched $C_{1-30}$ alkylene, an alkylene oxyalkylene, or an alkylene polyoxyalkylene.

5. The method of claim 4, wherein X is an anionic oxirane or methyloxirane homo or copolymer containing $(CH_2CH_2O)_x\ CH_2CH(CH_3)O)_4$ where x and y are independently selected from 1 to 1500 and mixtures thereof; an anionic ethylene vinyl copolymer; or an anionic olefin and maleic acid or anhydride optionally esterified with an alcohol.

6. The method of claim 4, wherein X of (I), (II) or (III) is a hydroxide, halide, anionic bicarbonate, anionic carbonate, anionic alkyl carbonate, anionic alkoxide or anionic carboxylate or a combination thereof.

7. The method of claim 3, wherein X is selected from the group consisting of anionic condensation polymers of alkylene oxides and glycols, anionic ethylene oxide/propylene oxide copolymers, arylsulfonates, anionic ureas, anionic thioureas, anionic polyether polyols, anionic polyethers, anionic polyol esters, anionic polyesters, anionic polyglycol esters, anionic polyurethanes, anionic oxyalkylated polymers condensation polymers of di-propylene glycol as well as trimethylol propane; anionic phenolic polymers, anionic alkyl substituted phenol formaldehyde resins, anionic oxyalkylated phenol formaldehyde resins, anionic alkoxylated epoxy resins, anionic diepoxides, anionic melamine acid colloids, alkylaryl sulfonates, alkylarylsulfonate, anionic amine salts, anionic aminomethylated polyacrylamide; anionic condensates of o-toluidine and formaldehyde; anionic polyalkylene glycols; sulfonated glycerides; sulfonated oils; anionic acetylated castor oils; anionic oxyalkylated ether sulfate salts, anionic copolymers of olefins and vinyl acetate; and anionic oxirane or methyloxirane polymers and mixtures thereof.

8. The method of claim 3, wherein X is selected from the group consisting of anionic ethylene vinyl acetate copolymers, anionic maleic olefin alkyl esters, anionic acrylate esters, anionic methacrylic esters, copolymers of maleic anhydride and α,β-unsaturated compounds, optionally reacted with primary monoalkylamines and/or aliphatic alcohols, anionic products of the reaction of alkenylspirobislactones with amines; anionic products of the reaction of α,β-unsaturated dicarboxylic anhydrides, α,β-unsaturated compounds and polyoxyalkylene ethers; anionic phenol formaldehyde resins or a mixture thereof.

9. The method of claim 3, wherein X is selected from the group consisting of anionic ethylene-vinyl acetate copolymers, anionic alpha olefin-maleic anhydride copolymer esters and anionic phenol formaldehyde resins and mixtures thereof.

10. The method of claim 1, wherein X is the anion of an ethylene-vinyl acetate copolymer of the structure:

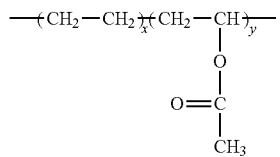

wherein x is from 1 to about 100 and y is from about 1 to about 100.

11. The method of claim 1, wherein X is the anion of an alpha olefin-maleic anhydride copolymer ester of the structure:

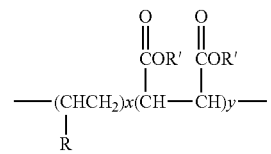

wherein R is a $C_{18}$ to $C_{30}$ alkyl group and R' is —H or $C_{18}$ to $C_{28}$ alkyl group.

12. The method of claim 2, wherein X is the anion of a phenol aldehyde resin of the structure:

(a)

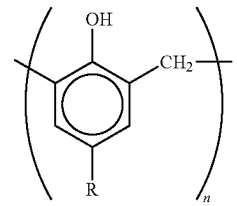

wherein R is —H or a $C_{1-20}$ linear or branched alkyl and n is greater than 2; or (b)

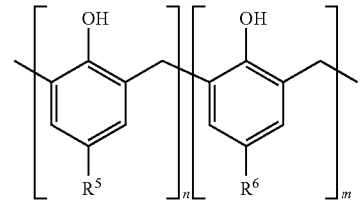

where $R^5$ is a $C_{1-20}$ linear or branched alkyl, $R^6$ is different from $R^5$ and is H or a linear or branched $C_{1-20}$ alkyl, and n and m are greater than 1.

13. The method of claim 12, wherein $R^5$ is a $C_{7-16}$ linear or branched alkyl and $R^6$ is a $C_{1-6}$ linear or branched alkyl.

14. The method of claim 1, wherein the ionic liquid is a component of a treatment composition comprising the ionic liquid and a second agent selected from the group consisting of paraffin inhibitors, pour point depressants and cold flow improvers, the paraffin inhibitors, pour point depressants and cold flow improvers not being an ionic liquid.

15. The method of claim 14, wherein X is an anionic oxirane or methyloxirane homo or copolymer containing $(CH_2CH_2O)_x\ CH_2CH(CH_3)O)_4$ where x and y are independently selected from 1 to 1500 and mixtures thereof; an anionic ethylene vinyl copolymer; or an anionic olefin and maleic acid or anhydride optionally esterified with an alcohol.

16. The method of claim 3, wherein the ionic liquid is added to the crude oil by either (a) injecting a slug of the ionic liquid into the well penetrating the subterranean reservoir; (b) introducing the ionic liquid through a capillary string; or (c) introducing the ionic liquid through an annulus of a downpipe in communication with the subterranean reservoir.

17. The method of claim 1, wherein the ionic liquid is added to the crude oil after the crude oil emerges from the subterranean reservoir.

18. The method of claim 1, wherein A is a cation selected from the group consisting of dicocodimethyl ammonium, ditallowdimethyl ammonium, benzyltrimethylammonium, dodecyl trimethylammonium, di-hydrogenated tallow dimethylammonium, cocodialkylammonium, tallowtrimethyl ammonium, cocotrialkyl ammonium cocodialkylammonium hydrogenated tallow trimethyl ammonium and oxydiethylene bis(cocodimethylammonium).

* * * * *